C. ANDEREGG.

Improvement in Wagon Wheels.

No. 122,347. Patented Jan. 2, 1872.

122,347

UNITED STATES PATENT OFFICE.

CHRISTIAN ANDEREGG, OF LAWRENCEBURG, INDIANA.

IMPROVEMENT IN WAGON-WHEELS.

Specification forming part of Letters Patent No. 122,347, dated January 2, 1872.

Specification describing certain Improvements in Carriage and Wagon Wheels, invented by CHRISTIAN ANDEREGG, of Lawrenceburg, in the county of Dearborn and State of Indiana.

This invention relates to the construction of wheels for wagons and carriages; and it consists in the mode of connecting the spokes to the hub, and manner of supporting them therein, as will be hereinafter more fully described.

Figure 1:
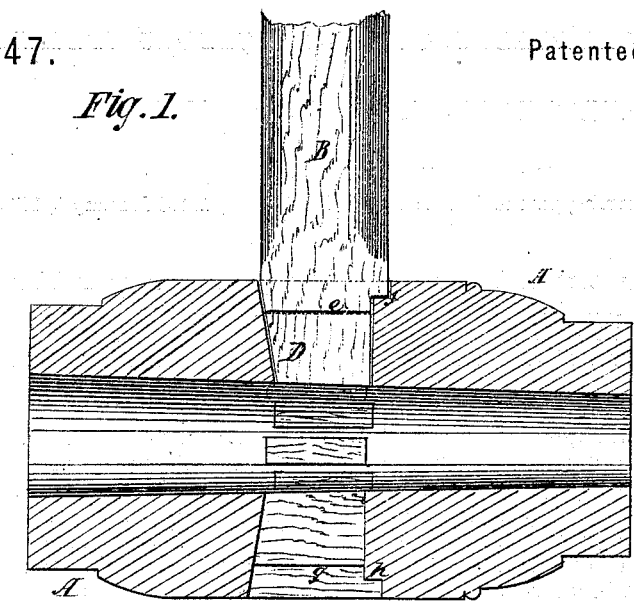
Figure 2:
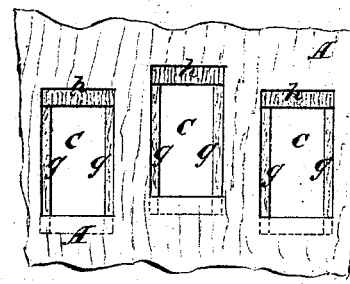
Figure 3:
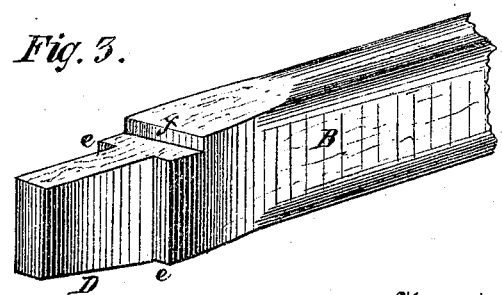

In the accompanying drawing, Figure I represents a longitudinal section of the hub, showing the construction of the tenon and mortise. Fig. 2 is a top view of a portion of the hub, showing the arrangement of the mortises therein. Fig. 3 is a perspective view of the spoke-tenon.

Similar letters of reference indicate corresponding parts.

A is the hub. B is the spoke. C is the mortise, and D is the tenon of the spokes. Unlike mortises in ordinary wagon or carriage hubs, I make my hub-mortise to receive a double tenon, the mortise consisting of an upper and a lower portion, the former receiving the real tenon of the spoke and the latter the butt end of the spoke itself. $e\ e$ are the side shoulders of the tenon, and $f$ is the edge-shoulder. These shoulders, it will be seen, are all sunk beneath the surface of the hub, and rest upon the bottom surfaces $g\ g$ and $h$ of the upper portion of the mortise. By this construction the entire strength of the spoke is preserved. The shoulders of the tenon cannot act as fulcrums for the spokes to pry upon the tenon, which is always the case where the shoulders of the tenon rest upon the surface of the hub. The mortises in the hub are arranged as seen in Fig. 2, so that the spokes stand bracing to the center of the felly of the wheel. The tenon and the butt of the spoke are made to tightly fit the mortise, so that the whole strength and elasticity of the spoke is secured. The advantages of this mode of connecting the spokes with the hub must be apparent to all.

Having thus described my invention, I claim as new and desire to secure by Letters Patent—

1. The shoulders $e\ e$ and $f$ of the spoke-tenon D, in combination with the shoulder surfaces $g\ g$ and $h$ in the mortise C, substantially as and for the purposes described.

2. The arrangement of the mortises C in the hub A, when the same are constructed substantially as shown and described.

CHRISTIAN ANDEREGG.

Witnesses:
 HENRY K. ANDEREGG,
 VALENTINE BECKER. (31)